Nov. 4, 1930.  B. S. LESLIE  1,780,237
AREA ESTIMATING DEVICE FOR SHEET MATERIAL
Filed March 12  1925
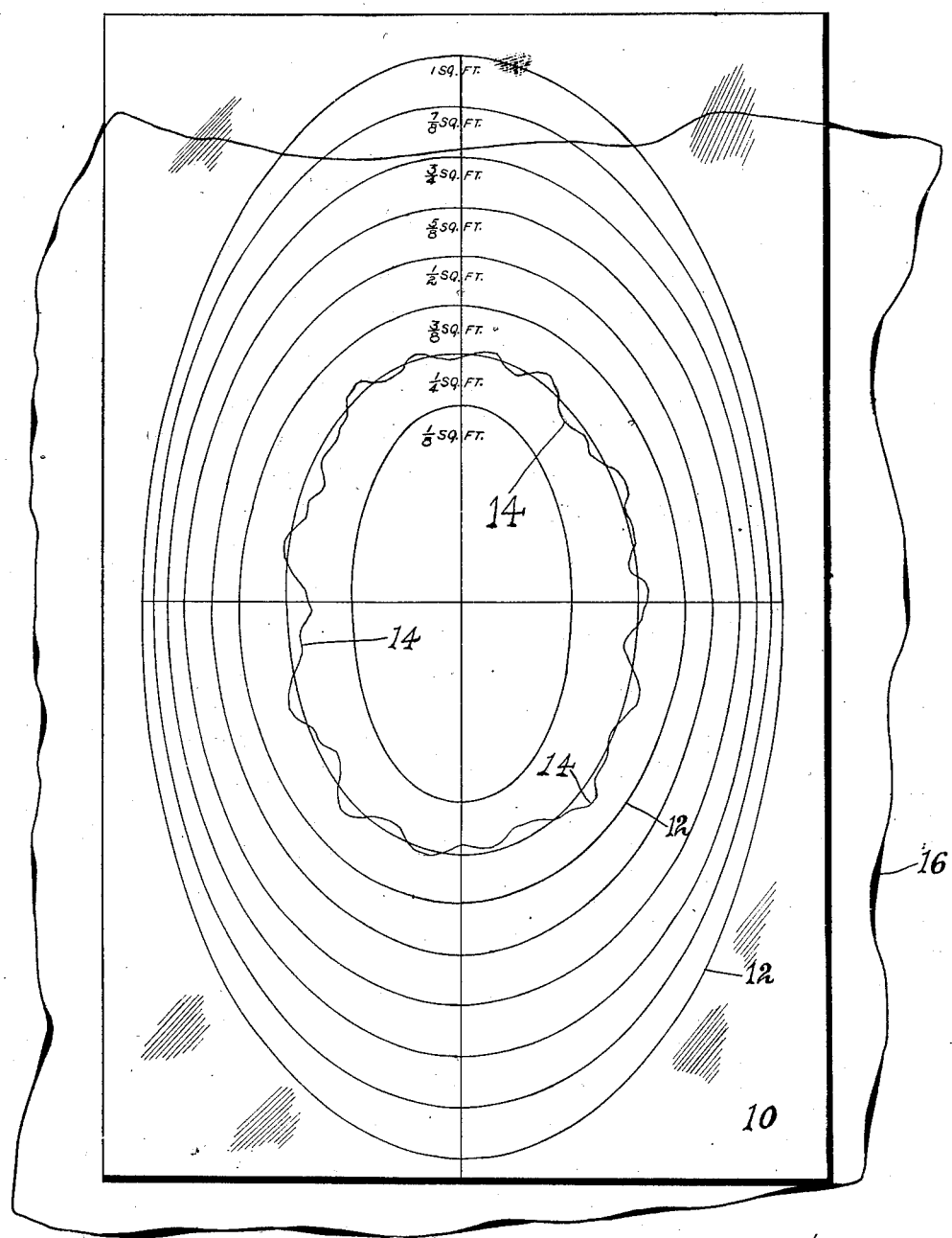
INVENTOR-
Bernard S. Leslie
By his Attorney,
Nelson W. Howard Patented Nov. 4, 1930

1,780,237

UNITED STATES PATENT OFFICE

BERNARD S. LESLIE, OF BEVERLY, MASSACHUSETTS, ASSIGNOR TO KRIPPENDORF KALCULATOR COMPANY, OF PORTLAND, MAINE, A CORPORATION OF MAINE

AREA-ESTIMATING DEVICE FOR SHEET MATERIAL

Application filed March 12, 1925. Serial No. 15,103.

This invention relates to devices for measuring sheet material and is herein illustratively disclosed as embodied in a device especially designed for determining the areas of inferior portions of leather skins used in shoemaking.

When an order of shoes is to be manufactured, the upper cutter is given a bundle of skins from which he is expected to produce the shoe upper parts required. Upper leather is quite expensive and it is desirable that he be given as little as is possible in order to force him to use his utmost skill in arranging the patterns on the skins before he cuts them. Many skins have imperfections in them, due to carelessness of the workman who removes the skin from the carcass, and also due to insect bites, scars caused by barbed wire and other causes. It is necessary, therefore, to determine the areas of the defective portions of the skins in order to estimate the gross square footage which is to be given to the cutter. It is an object of the present invention to provide an improved device by means of which areas such as areas to be deducted from the gross footage of skins by reason of imperfections can be readily estimated.

Accordingly, a feature of the invention consists in a transparent sheet having indicated on it a group of figures of convenient shape and of systematically varying known areas. In the illustrative embodiment of the invention shown in the drawing, these figures are ellipses varying in area by ⅛ square foot, from one to the next.

In the drawing, there is shown a device according to the present invention superposed on a skin having a blemished area.

The illustrated device 10 comprises a sheet of celluloid, and upon it are scratched with a sharp tool the outlines of the figures desired. These are herein shown as concentric ellipses 12, runing from ⅛ square foot to one square foot in area, by eighths of a square foot, the area of each ellipse being marked thereon. This kind of figure has proved successful in use, but a different shape of ellipse, or a figure of different form can be used in order to correspond more closely with the shapes of the faulty spot 14 in the particular skin 16 being surveyed.

A convenient series of ellipses may be determined as follows:—

The area of the ellipse is $\pi ab$ where $a$ and $b$ are the semi-axes. The areas of the ellipses of the series are selected as is convenient, for example as stated above, and divided by $\pi$ which will give the series of products $ab$. The shapes of the ellipses, that is, the ratios of length to breadth, being determined as desired for the particular class of work to be done, the values of the semi-axes themselves follow, and the ellipses can be laid out with an ellipsograph, the eccentric angle method, or by determining the central focal distances by the relation central focal distance = $\sqrt{a^2 - b^2}$ and using a string whose length is $2a$, with its ends at the foci.

In using the illustrated device, the operator will lay the skin on a table with the estimating device on it, and center the device over the imperfect areas of the skin, one by one, estimating the area of each imperfection by means of the device. The drawing shows a faulty spot 14 having an area of ¼ square foot.

The sum of these estimates is the total to be rejected from the total area of the skin.

While the illustrated device is made of celluloid, any transparent material having sufficient rigidity to preserve the areas marked upon it may be used.

What I claim as new and desire to secure by Letters Patent of the United States is:—

1. A device for estimating the faulty area of a sheet of material, consisting of a sheet of transparent material having a series of concentric figures of uniformly varying areas outlined upon it.

2. A device for estimating the faulty area of a sheet of material, consisting of a sheet of transparent material having a series of concentric ellipses upon it, the areas of which form an arithmetic series.

3. A device for estimating areas, consisting of a sheet of transparent material having a series of closed outlines of uniformly increasing areas drawn on it, each member of the series surrounding the preceding members, the numerical values of the areas of the outlines being indicated in connection with the respective outlines.

4. A device for estimating areas, consisting of a sheet of transparent material having a series of distinct closed outlines drawn on it, the areas of the outlines increasing in arithmetical progression, and their numerical values being indicated in connection with the respective outlines.

In testimony whereof I have signed my name to this specification.

BERNARD S. LESLIE.